United States Patent [19]

Igata et al.

[11] 4,394,701
[45] Jul. 19, 1983

[54] RECORDING TIME MODE DETECTOR

[75] Inventors: Kouichi Igata, Hirakata; Masaaki Kobayashi, Kawanishi, both of Japan

[73] Assignee: Matsushita Electric Industrial Co., Ltd., Osaka, Japan

[21] Appl. No.: 208,476

[22] Filed: Nov. 19, 1980

[30] Foreign Application Priority Data

Nov. 24, 1979 [JP] Japan .................................. 54-152324
Mar. 21, 1980 [JP] Japan .................................. 55-36676
Jul. 3, 1980 [JP] Japan .................................. 55-91486

[51] Int. Cl.³ ............................................ G11B 15/52
[52] U.S. Cl. .................................................... 360/137
[58] Field of Search ................................... 360/137, 73

[56] References Cited

U.S. PATENT DOCUMENTS

| | | | |
|---|---|---|---|
| 3,350,511 | 10/1967 | Johnson | 360/73 |
| 3,573,360 | 4/1971 | Rose | 360/137 |
| 4,044,389 | 8/1977 | Oldershaw et al. | 360/73 |
| 4,170,790 | 10/1979 | Satoh et al. | 360/73 |
| 4,237,499 | 12/1980 | Tachi | 360/73 |

Primary Examiner—Robert S. Tupper
Attorney, Agent, or Firm—Wenderoth, Lind & Ponack

[57] ABSTRACT

A recording time mode detector for automatically detecting the recording time mode of reproducing video tape. This detector is constructed of a counter which counts the number of rotations of the capstan which drives the reproducing video tape and is reset by a reproduced control signal. The recording time mode is detected by the count stored in the counter.

3 Claims, 8 Drawing Figures

RECORDING TIME MODE DETECTOR

BACKGROUND OF THE INVENTION

This invention relates to a recording time mode detector.

Recently, video tape recorders (VTR), which have switchable multiple recording time modes, have been developed using high density recording techniques. These VTR's have two or three recording time modes, that is, standard time play (S.P.), long time play (L.P.) and super long time play (S.L.P.). When reproducing, these VTR's must automatically detect the recording time mode, to avoid disturbance of the reproduced pictures. The recording time mode detector must operate quickly. The detector also needs to operate at variable reproducing speeds.

SUMMARY OF THE INVENTION

Accordingly, it is an object of this invention to provide a recording time mode detecotr which can quickly and accurately detect the recording time mode during slow motion reproduction, still mode reproduction, fast mode reproduction, and variable speed reproduction.

BRIEF DESCRIPTION OF THE DRAWINGS

The above object and features of this invention will be apparent upon considering the following detailed descriptions taken together with the accompanying drawings, wherein.

DESCRIPTION OF THE PREFERRED EMBODIMENTS

Now, a preferred embodiment of this invention will be described. Refering to FIG. 1, element 1 is a magnetic tape which is driven by a capstan 2 and a pinchroller 3 in the direction indicated by the arrow W. Recorded video signals are reproduced by rotating video heads (not indicated) which are mounted on a rotating disk (not indicated). The capstan 2 is driven by a capstan motor 4 through a belt 5. A frequency generator 6 detects the number of rotations of the capstan motor 4.

Figure 1:
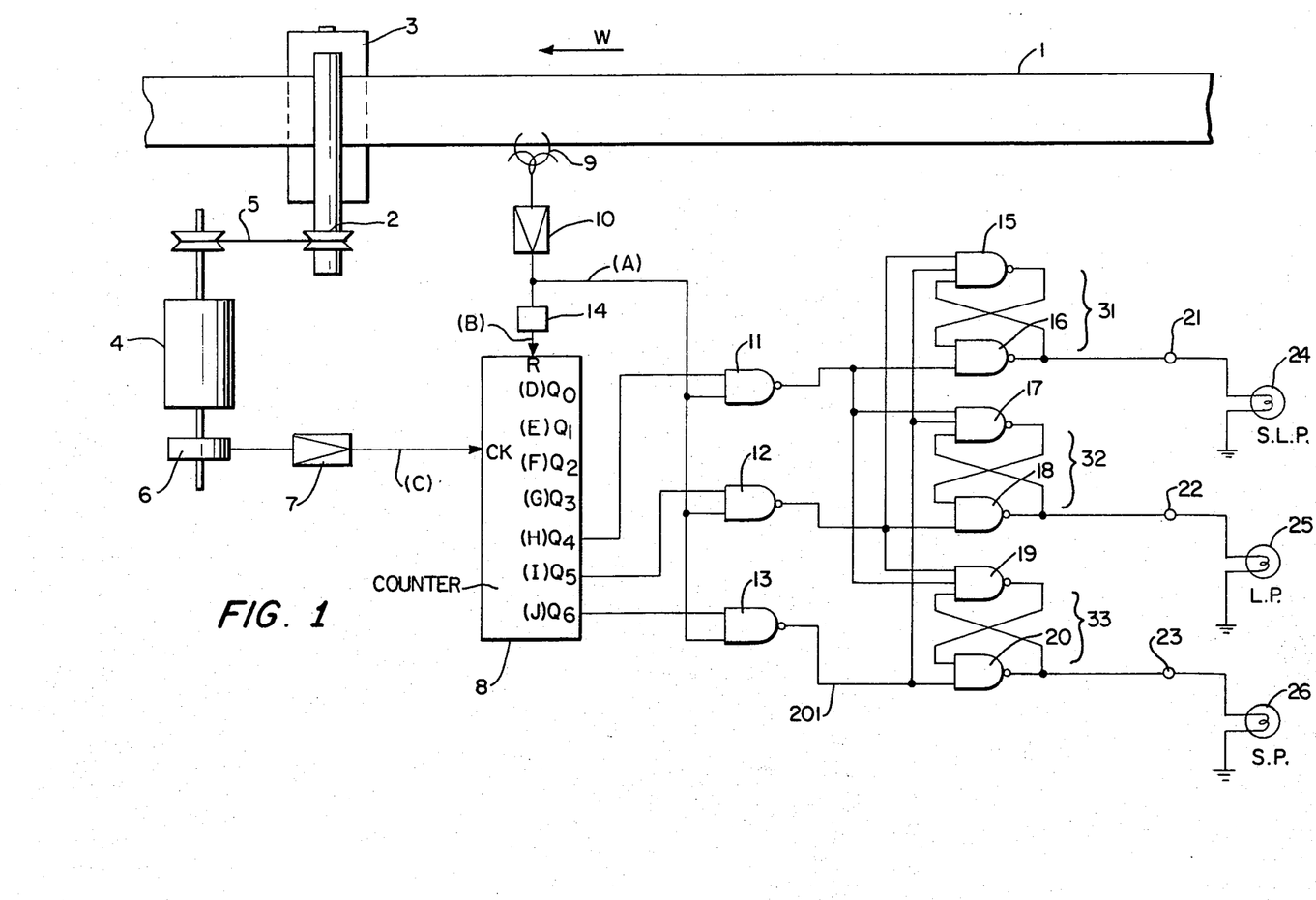
FIG. 1 is a block diagram of a video tape recorder/reproducer according to this invention.

The number of output pulses of the generator 6 is proportional to the running speed of the magnetic tape 1. The output pulses are amplified by the amplifier 7 and are supplied to an input terminal CK of a counter 8. A control head 9 reproduces control signals which are recorded on the magnetic tape 1. The control signals are recorded on the magnetic tape 1 at the rate of one pulse per frame (1/30 sec). The reproduced control signals are amplified by an amplifier 10 and supplied to NAND gates 11, 12 and 13. The output signals of the amplifier 10 are also supplied to a wave shaper 14. The wave shaper 14 amplifies the control signals and supplies the trailing edges of the control signals to a reset terminal R of the counter 8. The output pulses of the output terminals $Q_4$, $Q_5$ and $Q_6$ of the counter 8 are supplied to the NAND gates 11, 12 and 13.

NAND gates 15 and 16 make up an R-S Flip-flop (FF) 31. NAND gates 17 and 18 make up an R-S Flip-flop 32. NAND gates 19 and 20 made up an R-S Flip-flop 33. The output pulses of the NAND gate 11 are supplied to the S terminal of the Flip-flop 31 and to the R terminal of the Flip-flop 32 and the Flip-flop 33. The output pulses of the NAND gate 12 are supplied to the S terminal of the Flip-flop 32 and the R terminal of the Flip-flop 31 and the R terminal of the Flip-flop 33. The output pulses of the NAND gate 13 are supplied to the S terminal of Flip-flop 33 and the R terminal of the Flip-flop 31 and the R terminal of the Flip-flop 32.

The S terminal of one of the R-S Flip-flops is connected to the R terminal of the other R-S Flip-flop. As a result, the output of one of the R-S Flip-flops is a High level and the output of the other R-S Flip-flop is a Low level. The output terminals of the R-S Flip-flops 31, 32, 33 are connected to the terminals 21, 22, 23. When the level of the terminal 21 is High, the reproduction mode is recognized to be the S.L.P. mode and a lamp 24 turns on. When the level of the terminal 22 is High, the reproducing mode is recognized to be the L.P. mode and a lamp 25 turns on. When the level of the terminal 23 is High, the reproducing mode is recognized to be the S.P. mode and a lamp 26 turns on. Light emitting diodes can be used for these lamps 24, 25, 26.

Figure 2:
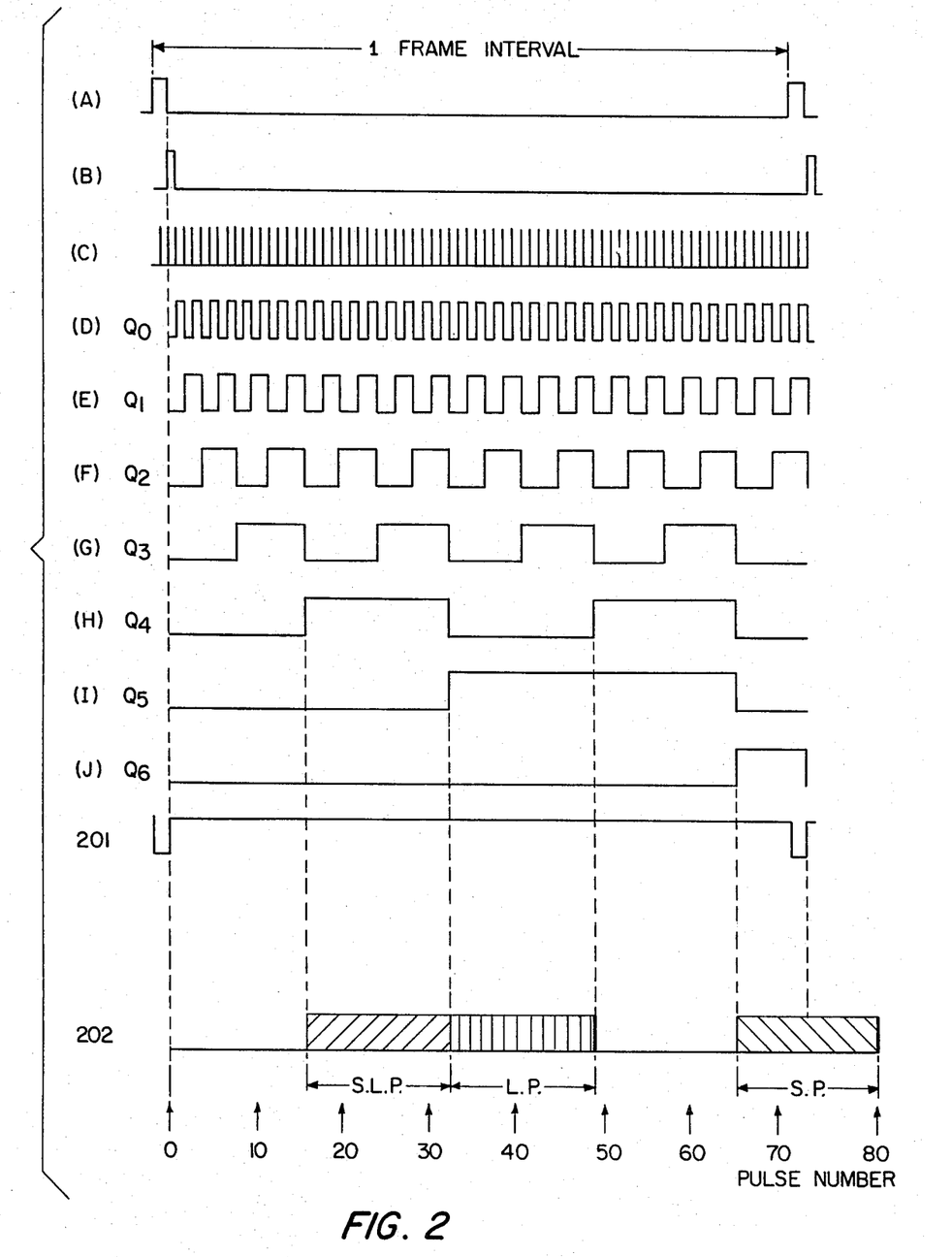
FIG. 2 shows the signals appearing at various points of FIG. 1.

FIG. 2 shows the signals at various points during the S.P. mode reproduction. The levels of the signals are indicated to be either High or Low. FIG. 2-(A) shows control signals which are reproduced by the control head 9. The interval of the control signals is one frame at normal speed. FIG. 2-(B) shows the reset signals of the counter 8. The reset signals which are the trailing edges of the control signals are supplied by the wave shaper 14. FIG. 2-(C) shows the output pulses of frequency generator 6 which detects the number of rotations of the capstan motor 4. The output pulses are fed to the CK terminal of the counter 8. FIG. 2-(D), (E), (F), (G), (H), (I), (J) show output pulses of terminals $Q_0$, $Q_1$, $Q_2$, $Q_3$, $Q_4$, $Q_5$, $Q_6$ of the counter 8.

The number of pulses between control signals are always constant. During slow motion reproduction, the interval between control signals is longer than the interval during normal mode reproduction, and the frequency of the frequency generator 6 is lower than the frequency during normal mode reproduction.

In the standard play (S.P.) mode, the interval between control signals contains 72 pulses of the frequency generator 6. The output signals (D)–(J) of the output terminals $Q_0$–$Q_6$ which is shown in FIG. 2 repeat at the control signal period. The upper bits (H), (I), (J) of the counter 8 are supplied to the NAND gates 11, 12, 13. The control signals (A) are supplied to another input terminal of the NAND gates 11, 12, 13. Between 16 pulses to 31 pulses, the output signal of only $Q_4$ of the upper three bits of the counter is High. Between 32 pulses to 47 pulses, the output signal of only $Q_5$ of the upper three bits is High. Between 64 pulses to 79 pulses, the output signal of only $Q_6$ of the upper three bits is High.

In the Standard Play (S.P.) mode, 72 pulses are counted between control signals, and, the output signal of $Q_6$ is High and the signal shown in FIG. 2-201 is supplied to the output terminal of GATE 13. Since the output signals of $Q_4$ and $Q_5$ are Low, the output signals of NAND gates 11, 12 are kept High.

In the Long Play (L.P.) mode, 36 pulses are counted between control signals. In the Super Long Play (S.L.P.) mode, 24 pulses are counted between control signals. In the L.P. mode, the signal 201 is obtained by NAND gate 12. In the S.L.P. mode, the signal 201 is obtained by NAND gate 11. The number of pulses of each mode can cover a range which is shown in FIG. 2-202. The range includes errors such as belt 5 slipping.

In the S.P. mode, the signal shown in FIG. 2-201 sets the R-S flip-flop circuit (FF) 33 and resets the R-S FF 31 and the R-S FF 32. The output terminal 23 voltage of the R-S FF 33 then becomes High and the light emitting diode 26 for the S.P. mode is turned on.

The L.P. mode and S.L.P. mode are detected the same way. When recording, the running distances of the magnetic tape 1 per unit time are different in the S.P. mode, the L.P. mode and the S.L.P. mode. In this invention, the reproducing mode is automatically detected by counting the pulses which are reset by the control signal of the frequency generator 6.

In this description, the S.P. mode has 72 pulses between control signals. In the L.P. mode, the recording time is twice that of the normal mode, and the number of pulses is 36 between control signals. In the S.L.P. mode, the recording time is three times that of the normal mode, and the number of pulses is 24 between control signals.

Since the recording mode is detected between every pair of control signals, the detecting speed and the detecting accuracy are high. Since the number of pulses of the frequency generator 6 is constant in one recording mode, the mode can be detected during slow motion reproduction or fast motion reproduction or variable speed reproduction and so on. A magnetic flux responsive head can be used for the control head 9. By using the flux responsive prior head, control signals can be detected in order to stop the magnetic tape 1. The mode can thus be detected just prior to stopping the tape.

In the above description, the recording mode can be detected with high speed and high accuracy.

Furthermore, the recording mode can be detected irrespective of the tape reproduction speed.

Figure 3:
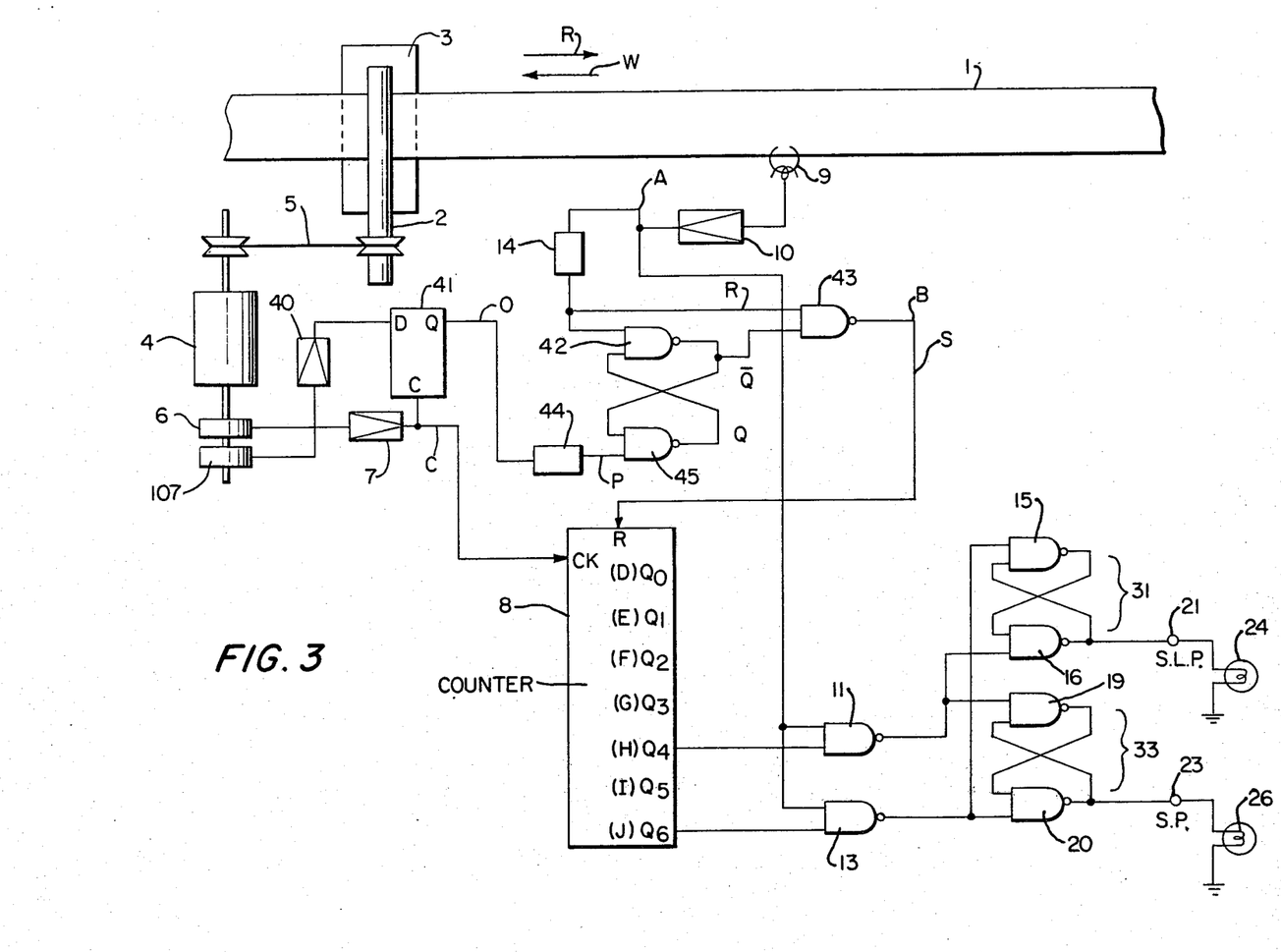
FIG. 3 is another block diagram of a video tape recorder/reproducer according to this invention.

Now, another preferred embodiment of this invention will be described. This embodiment has no miss-operation when changing the running direction of the magnetic tape. Referring to FIG. 3, 1 is a magnetic tape which is driven by a capstan 2 and by a pinchroller 3. The drive direction can selected to be either W or R. Recorded video signals are reproduced by rotating video heads (not indicated) which are mounted on a rotating disk (not indicated). The capstan 2 is driven by a capstan motor 4 using a belt 5. Frequency generators 6 and 107 detect the number of rotations of the capstan motor 4. The number of output pulses of the generators is proportional to the running speed of the magnetic tape 1.

The output signals of the frequency generator 6 have a 90° phase shift with respect to the output signals of the frequency generator 107. The output signals of the frequency generator 6 are amplified by an amplifier 7 and are supplied to a counter 8 and also supplied as clock signals to a D type flip-flop circuit (D FF) 41. The output signals of the frequency generator 107 are amplified by an amplifier 40 and are supplied to the D terminal of the D FF 41. Clement 9 is a control head which reproduces control signals. The control signals were recorded every one frame during the recording of video signals. The reproduced control signals are amplified by an amplifier 10 and are supplied to one of the input terminals of NAND gates 11 and 13.

A wave shaper 14 supplies narrow pulses of the trailing edges of the control signals to NAND gates 42 and 43. For example, the wave shaper 14 may be made up of two D FFs and one GATE. Since the phase relationship of the output signals of the frequency generators 6 and 107 is 90°, the D FF 41 outputs a High level with magnetic tape 1 running forward. With magnetic tape 1 running backward, the capstan motor 4 rotates in the reverse direction and the phase relationship of the frequency generators 6 and 107 is reversed.

The D FF 41 outputs a Low level with the magnetic tape 1 running backward. The outut signal of the D FF 41 is supplied to the F/R pulse generator 44 which generates a narrow pulse (F/R pulse) when the magnetic tape 1 changes its running direction. For example, the F/R pulse generator 44 may be made up of two D FFs and one GATE. The output signal of generator 44 sets a R-S flip-flop which is made up of NAND gates 42 and 45, and the R-S flip-flop is reset by the output signal of the wave shaper 14. The $\overline{Q}$ signal of the R-S flip-flop and the output signal of the wave shaper 14 are supplied to the NAND gate 43. The output signal of the NAND gate 43 resets the counter 8. The $Q_4$ $Q_6$ signals of the counter 8 are supplied to other input terminals of the NAND gates 11 and 13.

R-S flip-flop (FF) 31 is made up of NAND gates 15 and 16. R-S flip-flop 33 is made up of NAND gates 19 and 20. The output signal of the NAND gate 14 sets the R-S FF 31 and resets the R-S FF 33. The output signal of the NAND gate 13 sets the R-S FF 33 and resets the R-S FF 31. These R-S FFs are connected exclusively.

In the S.L.P. (Super long play) mode, the level of output terminal 21 is High and a lamp 24 turns on. In the S.P. (Standard play) mode, the level of output terminal 23 is High and a lamp 26 turns on. These lamps 23 and 26 may use light emitting diodes.

Figure 4:
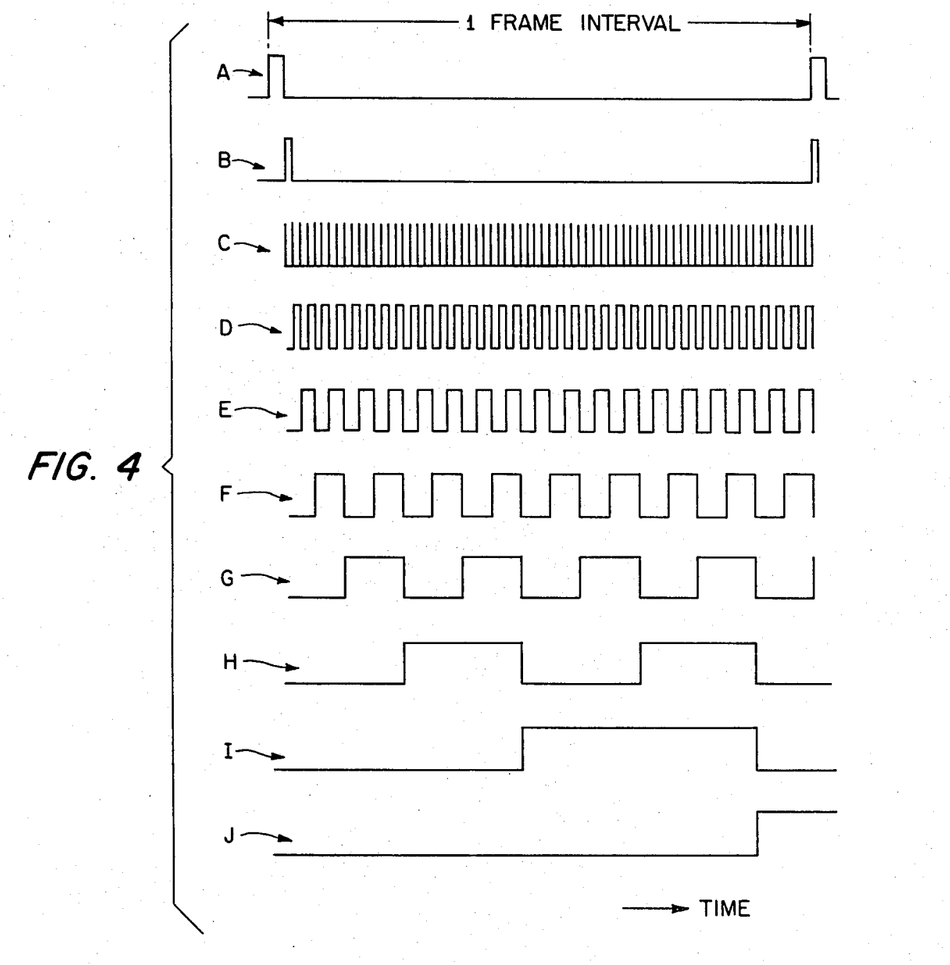
FIG. 4, including A-J, shows the signals appearing at various points of FIG. 3.

FIG. 4 shows the signals at various points in the S.P. reproduction mode. The levels of the signals are indicated either as High or Low. FIG. 4-A shows reproduced control signals. FIG. 4-B shows a narrow pulse which is the trailing edge of the control signal. The narrow pulse resets the counter 8. The control signal is generated by the wave shaper 14 and is inverted by the NAND gate 43. FIG. 4-C shows the output signals of the frequency generator 6 which detects the number of rotations of the capstan motor 4. FIG. 4-D-J shows the output signals of the $Q_0$-$Q_6$ of the counter 8 which counts the output signal of the frequency generator 6. The number of pulses between control signals is constant and independent of the tape running speed. In the S.P. mode, the interval between control signals has 72 pulses shown in FIG. 4-C. Since the counter 8 is reset by the signal shown in FIG. 4-C, the signals of $Q_0$-$Q_6$ are repeated between control signals. That is realized when the magnetic tape 1 also runs in the reverse direction.

Figure 5:
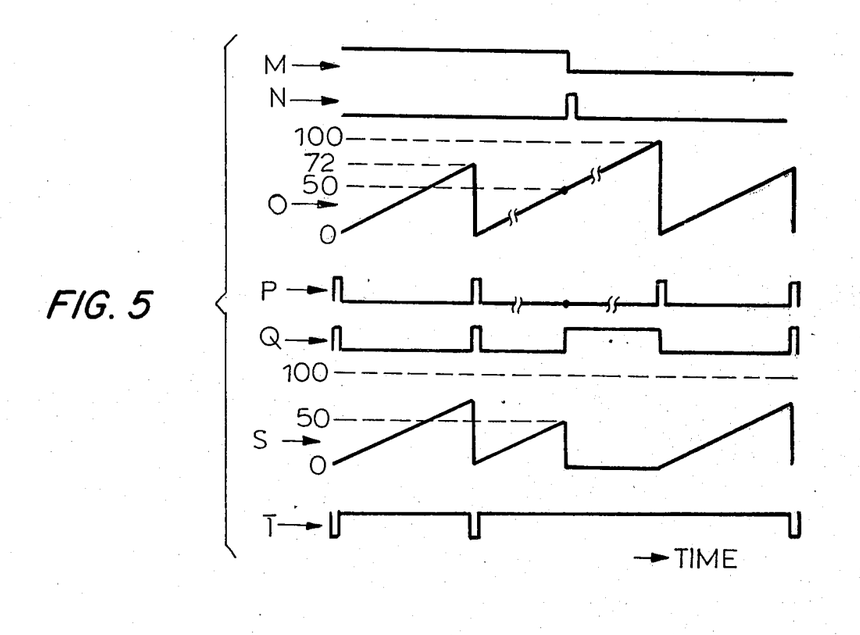
FIG. 5 shows the signals appearing at various points of FIG. 3 at the moment of change of the tape transport direction.

FIG. 5 shows when the running direction of the magnetic tape 1 is changed from forward to reverse. FIG.

5-M shows the output signals of D FF 41, whose level is High when the tape is running forward and whose level is Low when the tape is running backward. FIG. 5-N shows the output pulse of F/R pulse generator 44, which is generated when the magnetic tape 1 changes its running direction. FIG. 5-O shows converted analog signals of the digital output signals of $Q_0$–$Q_6$. For example, a digital to analog convertor may be made up of a ladder type resistor network. FIG. 5-P shows the control signal which is shaped by the wave shaper 14.

The number of pulses between control signals is 72, if the magnetic tape 1 is run in a constant direction. But, when the running direction of the magnetic tape 1 is changed, the number of pulses between control signals is not constant. During this turning period, the first control signal and the last control signal are the same. FIG. 5-O shows that the magnetic tape is run in the forward direction until the counter 8 counts 50 pulses. After the counter 8 counts 50 pulses, the running direction of the magnetic tape 1 is changed from one direction to another. As a result, the counter 8 counts 100 pulses, until the next control signal is reproduced. During this change of direction period, there is possibility of a mistaken recording mode detection. To avoid this error, the counter 8 is reset during this change of direction period as explained below. The counter 8 is reset by the shape control signals and a new signal. An R-S FF made up of NAND gates 42 and 45, is set by the F/R pulse and is reset by the first control signal which occurs after the change of direction. The output signal of this R-S FF is the new signal.

FIG. 5-N shows the F/R pulse. FIG. 5-Q shows the reset signals of the counter 8. FIG. 5-S shows converted analog signals of the digital output signals of $Q_0$–$Q_6$. In one direction of operation, the counter 8 counts 72 pulses during one control signal reproduction time, and during this change of direction period, the counter 8 is reset. Since the counter 8 counts 24 pulses between control signals in the S.L.P. mode, a NAND gate 11 supplies signals which are shown in FIG. 5-T. During the change of direction period, R-S FF 31 and 33 are operated in the same way as in the S.P. mode.

In the above descriptions, the counter 8 is reset from the F/R pulse to the control signal which is the first occurring after the change of direction.

Figure 6:
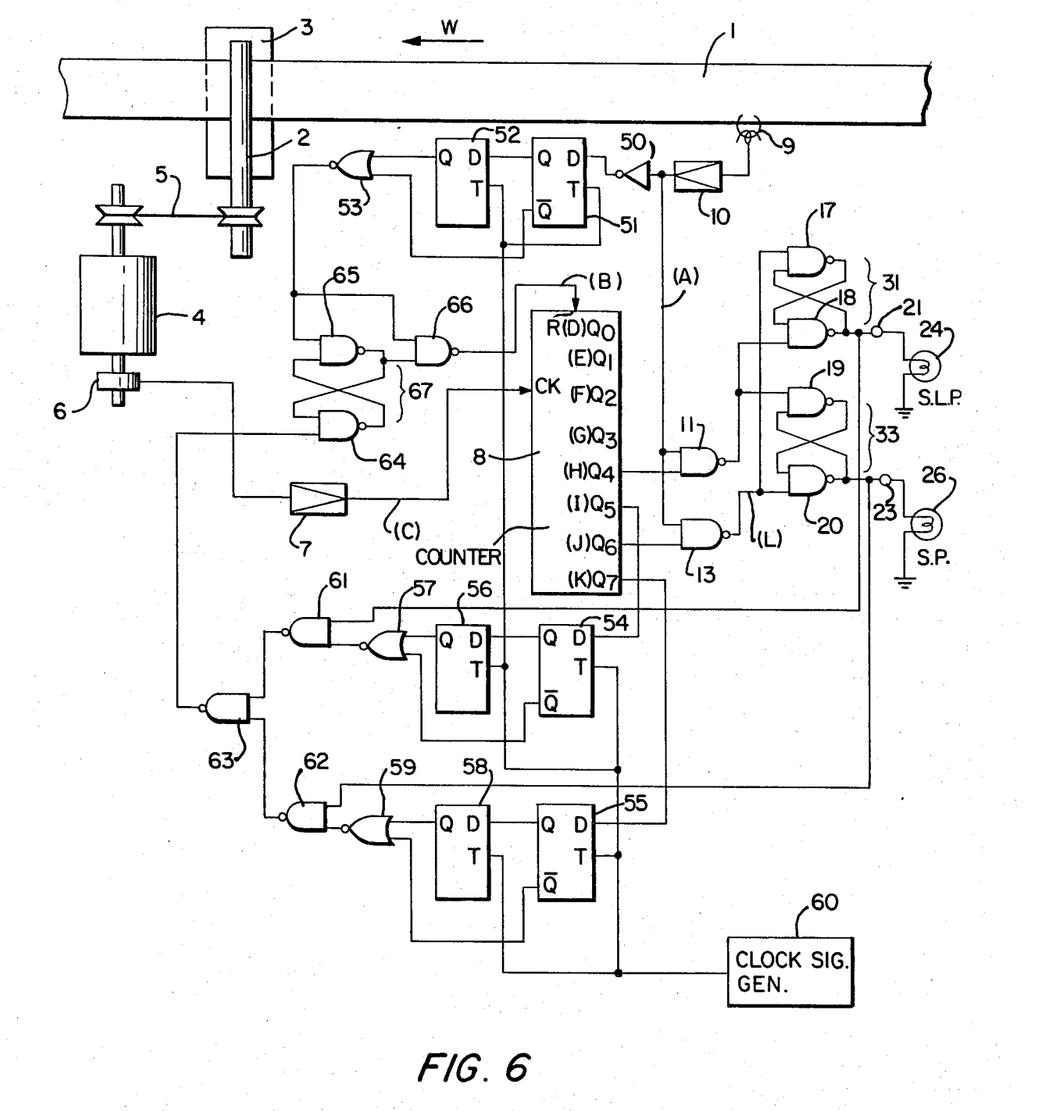
FIG. 6 is another block diagram of a video tape recorder/reproducer according to this invention.
Figure 7:
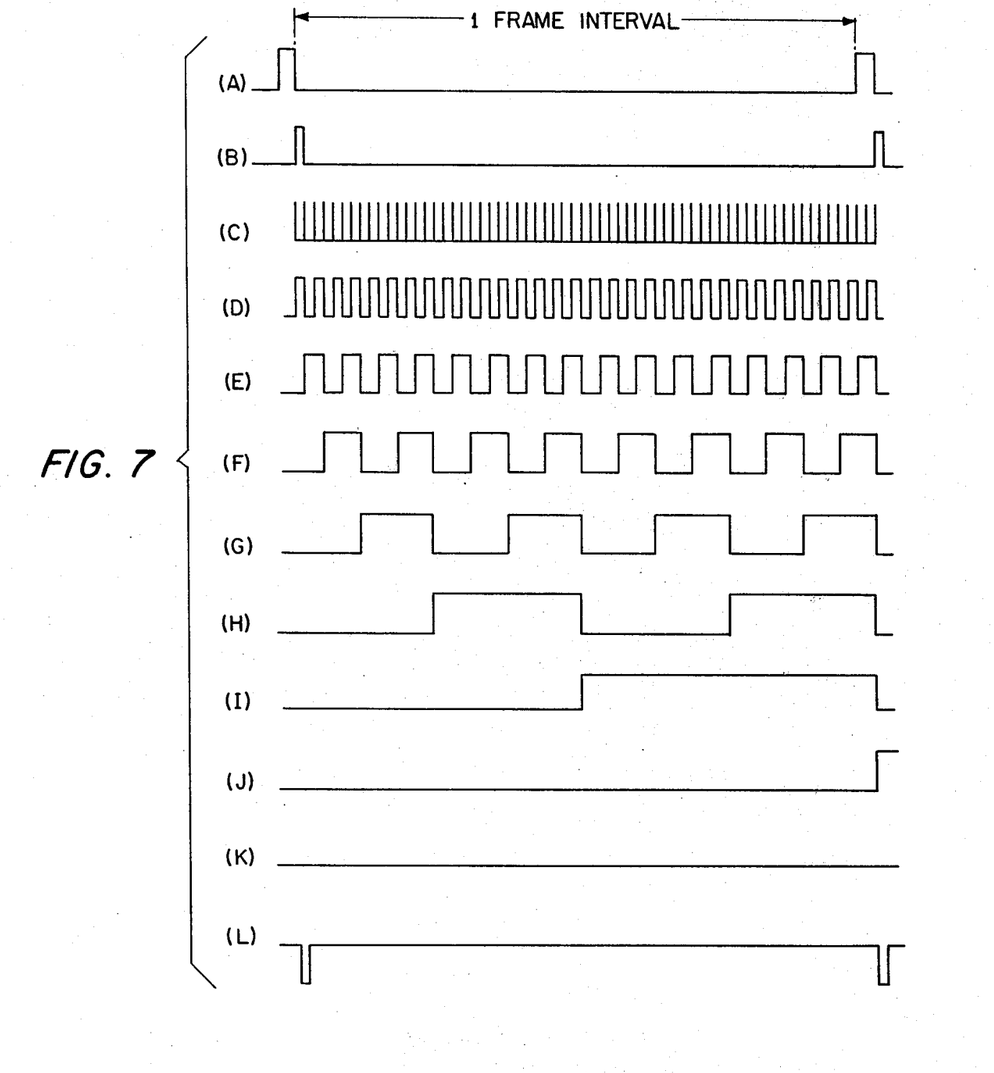
FIG. 7, including A-L, shows the signals appearing at various points of FIG. 6.

Now, another preferred embodiment of this invention will be described. This embodiment has no miss-operation when control signals are dropped. Referring to FIG. 6, control signals are reproduced by the control head 9 and are amplified by an amplifier 10. The amplified control signals are supplied to the NAND gates 11, 13. The amplified control signals are inverted by an invertor 50 and are supplied to a D terminal of a D FF 51. The Q terminal of the D FF 51 is connected to a D terminal of another D FF 52. The $\overline{Q}$ terminal of the D FF 51 is connected to a NOR gate 53. The Q terminal of the D FF 52 is also connected to the NOR gate 53.

The $Q_4$ and $Q_6$ terminals of the counter 8 are connected to the NAND gates 11 and 13. R-S FF 31 are constructed of NAND gates 15 and 16. R-S FF 33 are constructed of NAND gates 19 and 20. The output signals of the NAND gate 11 are supplied to the S terminal of the R-S FF 31 and are supplied to the R terminal of the R-S FF 33. The output signals of the NAND gate 13 are supplied to the R terminal of the R-S FF 31 and are supplied to the S terminal of the R-S FF 33. These R-S FFs are connected exclusively. In the S.L.P. mode, the level of the output terminal 21 is High and the lamp 24 turns on. In the S.P. mode, the level of the output terminal 23 is High and the lamp 26 turns on.

The $Q_5$ and $Q_7$ terminals of the counter 8 are connected to D terminals of D FFs 54 and 55. The Q terminal of the D FF 54 is connected to the D terminal of a D FF 56. The Q terminal of the D FF 54 is connected to a NOR gate 57. The Q terminal of a D FF 56 is also connected to the NOR gate 57. The Q terminal of the D FF 55 is connected to the D terminal of a D FF 58. The Q terminal of the D FF 55 is connected to a NOR gate 59. The Q terminal of the D FF 58 is also connected to the NOR gate 59, too. Clock signals of a clock signal generator 60 are supplied to the T terminals of D FFs 54, 55, 56, 58, 51 and 52. For example, the clock signal generator 60 may be constructed of a oscillator circuit. A NAND gate 61 is connected to the NOR gate 57. The NAND gate 61 is also connected lto the R-S FF 31. A NAND gate 62 is connected to the NOR gate 59. The NAND gate 62 is connected to the R-S FF 33. The NAND gates 61 and 62 are connected a NAND gate 63. The output signals of the NAND gate 63 are supplied to a NAND gate 64. The output signals of the NOR gate 53 are supplied to NAND gates 65 and 66. An R-S FF 67 is constructed of the NAND gates 64 and 65. The Q terminal of the R-S FF 67 is connected to the NAND gate 66. The output signals of the NAND gate 66 are supplied to the R terminal of the counter 8.

Figure 8:
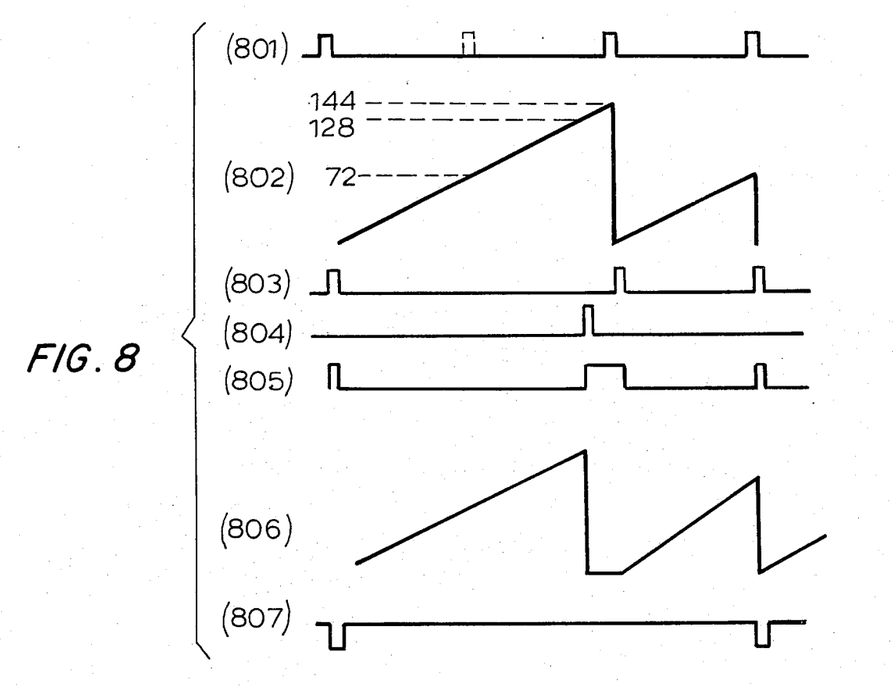
FIG. 8 shows the signals appearing at various points of FIG. 6 when control signals are dropped.

FIG. 8 shows the timing when one control signal cannot be reproduced due to a dropout. Some cracks of the tape 1 or dust on the tape 1 may cause the dropout. FIG. 8-801 shows the reproduced control signals and one dropout. The dropout is shown by a dotted line.

FIG. 8-802 shows converted analog signals which are output signals of $Q_0$–$Q_7$ of the counter 8 of the same timing shown in FIG. 8-801.

FIG. 8-803 shows the reset signals of the counter 8. The signals have one dropout, too. By this dropout, the counter cannot reset at 72 pulses and counts toward the next control signal. FIG. 8-802 shows that the counter counts 144 pulses. By this miscount, the NAND gate 11 supplies a LOW signal and the system detects the S.L.P. mode instead of the S.P. mode. Sometimes many dropouts occur. But this system detects the turning to High of the upper bit of the counter 8 when a dropout occurs. The turning to High is detected by the D FFs 55, 58 and the NOR gate 59. In the S.L.P. mode, the turning to High is detected by the D FFs 54, 56 and the NOR gate 57. The turning to High is selected by the NAND gates 61 and 62 in accordance with the recording mode.

In the above descriptions, the counter 8 is reset by the first control signal after dropout and a miscount cannot occur.

What is claimed is:

1. In a multi-speed video tape recorder/reproducer utilizing a magnetic tape having video information and control signals recorded thereon, and having a magnetic tape driving means comprising a capstan, and further having one of said control signals recorded on said magnetic tape indicative of a video frame, a recording time mode detector for detecting the recording time mode of the video information recorded on said magnetic tape, said recording time mode detector comprising:

a reproducing head means for reproducing said control signals recorded on said magnetic tapes;

a frequency generator means operatively mechanically connected to said capstan for providing a signal indicative of the number of rotations of said capstan;

a counter means for counting the number of pulses output by said frequency generator means during a video frame, a clock input of said counter means being connected to said frequency generator means and a reset input of said counter means being connected to said reproducing head means;

a decoder and storage means operatively connected to said reproducing head means and said counter means for detecting and storing the recording time mode of said magnetic tape by determining the count stored in said counter means during one video frame;

and indicator means operatively connected to said decoder and storage means for indicating the detected recording time mode.

2. A recording time mode detector as recited in claim 1, further comprising a means for reversing the direction of said magnetic tape and further comprising a means for detecting a change in direction of said tape and for resetting said counter means and keeping said counter means in a reset condition from the time that said tape changed direction occurs until the time that said reproducing head means reproduces the following control signal.

3. A recording time mode detector as recited in claim 1, further comprising a means for detecting dropout of said control signals recorded on said magnetic tape and means for resetting said counter means and keeping said counter means reset from the time when dropout is detected until said reproducing head means reproduces the following control signal.

* * * * *